United States Patent [19]

Egawa et al.

[11] Patent Number: 5,005,949

[45] Date of Patent: Apr. 9, 1991

[54] ANTI-GLARE COVERING FOR ILLUMINATE INDICATOR

[75] Inventors: Toshihiko Egawa; Satoshi Odashima, both of Saitama, Japan

[73] Assignee: Shin Etsu Polymer Co., Ltd., Tokyo, Japan

[21] Appl. No.: 427,040

[22] Filed: Oct. 25, 1989

[30] Foreign Application Priority Data

Oct. 27, 1988 [JP] Japan .......................... 63-140307[U]

[51] Int. Cl.[5] .............................................. G02B 27/00

[52] U.S. Cl. ................................ 350/276 R; 350/319; 362/354

[58] Field of Search ............. 350/276 R, 276 SL, 311, 350/319, 321, 322; 358/247, 252, 255; 362/95, 354, 255, 29

[56] References Cited

U.S. PATENT DOCUMENTS

| | | | |
|---|---|---|---|
| 3,511,563 | 5/1970 | Erwin | 350/276 R |
| 3,642,557 | 2/1972 | Warp | 350/276 R |
| 4,688,156 | 8/1987 | Suzuki et al. | 362/354 |
| 4,709,988 | 12/1987 | Kai et al. | 350/276 R |
| 4,877,308 | 10/1989 | Okuno et al. | 350/276 R |
| 4,892,387 | 1/1990 | Takeuchi et al. | 350/319 |

*Primary Examiner*—Bruce Y. Arnold
*Assistant Examiner*—Loha Ben
*Attorney, Agent, or Firm*—McAulay Fisher Nissen Goldberg & Kiel

[57] ABSTRACT

The anti-glare covering for illuminate switch or indicator of the invention is formed of a covering member shaped from a transparent synthetic resin and a microlouver-type anti-glare sheet melt-bonded to the lower surface of the covering member. This structure is different from conventional anti-glare coverings for illuminate switch or indicator in which the covering member has a top opening and the microlouver-type anti-glare sheet covers the opening. Thus, the anti-glare covering of the invention is provided with improved visiblity and rigidity and is easy to maintain beautiful appearance. The visibility of the illuminate switch or indicator is further improved by providing a thin light-transmitting metallizing layer on the upper surface of the covering member at the top portion.

5 Claims, 3 Drawing Sheets

ANTI-GLARE COVERING FOR ILLUMINATE INDICATOR

BACKGROUND OF THE INVENTION

The present invention relates to an anti-glare covering for illuminate switch or indicator or, more particularly, to an anti-glare key-top covering for illuminate switch installed, for example, in the room of an automobile capable of ensuring good visibility to the viewer and preventing the illuminate switch from being mirror-imaged on the windowpane and the like.

It is very common in recent years that various illuminate switches and illuminate indicators are used in the room of automobiles, aircrafts, vessels and the like as on the dashboard of a car. The covering of such an illuminate switch or indicator bears letters, symbols, patterns and the like thereon for indication and has a light source below by which the covering is illuminated from behind so as to give good visibility of the indication letters and the like to the viewer. It is important from the standpoint of safety of driving that the covering for such an illuminate switch or indicator is anti-glaring which means that any extraneous external light can be shielded by permitting the light from inside to be transmitted therethrough as completely as possible and that the illuminate switch or indicator per se is prevented from mirror-imaged on the windowpane.

One of the most convenient and effective ways to render such a cover anti-glaring is to use an anti-glare microlouver sheet for constructing the top portion of the covering, which is illuminated with a light from behind. The anti-glare microlouver sheet here implied is illustrated in FIG. 1 by a cross sectional view, which is a sheet 1 composed of alternate stripes or layers of transparent portions 2 and deeply colored or opaque portions 3 in a microscopically fine louver-like fashion, optionally, provided with surface-protecting films 4 on at least one surface thereof. The above described anti-glare microlouver sheet is made from a plastic resin such as a cellulose acetate butyrate or a rubbery elastomer such as a silicone rubber.

FIG. 2 illustrates a cross sectional view of a typical conventional anti-glare covering an anti-glare microlouver sheet 21 composed of alternately arranged stripes of transparent silicone rubber layers 22 and colored silicone rubber layers 23. The anti-glare microlouver sheet 21 is mounted above the opening 28 at the top portion of a key-top cover 24 in the recessed cavity 25 by adhesively bonding with an adhesive 26. The anti-glare sheet 21 is illuminated from behind with a lamp 29 so as to give glare-free visibility to the eyes viewing from above. The anti-glare covering illustrated in FIG. 2 is not always quite satisfactory due to several problems and disadvantages. For example, the anti-glare sheet 21 is adhesively bonded to the covering member 24 with the adhesive 26 only on a very limited surface area so that the anti-glare microlouver sheet 21 sometimes falls from the position by failure of adhesion. When it is intended to solve this problem by increasing the area available for adhesive bonding, the effective area of the anti-glare sheet 21 is correspondingly decreased to affect the visibility of the switch or indicator so that the versatility in the design of the top portion of the covering member 24 is very limited. Since the anti-glare sheet 21 is mounted in the recessed cavity 25 on the top portion of the covering member 24, in addition, a gap space 27 is unavoidably formed around the anti-glare sheet 21 and dusts and finger filths are deposited in this gap space 27 in the long run of use to cause a problem in the hygiene and beautiful appearance. An anti-glare microlouver sheet made from a silicone rubber has low rigidity and is poorly resistant against compressive force so that it is sometimes unavoidable that the sheet under hot-pressing is deformed and the view angle of the micrlouvers is uncontrollably changed. When the anti-glare microlouver sheet is formed from a cellulose acetate butyrate, the sheet is sometimes deformed or emits unpleasant odor in the course of preparation thereof by hot-pressing due to the low heat resistance of the material.

The anti-glare covering of an illuminate indicator in the prior art illustrated in FIG. 2 is also disadvantageous in respect of the relatively low light transmission so that, especially when the letters and patterns for indication below the anti-glare sheet are provided at a distance from the top plate of the covering, the visibility of the letters and patterns is poor under daylight leading to occurrence of shades of the illuminated portion. Although this problem can be partly solved by providing the upper surface thereof with a white coating, this means is not practical due to the loss in both of the visibility and anti-glaring effect as a consequence of the irregular diffusion of light by the particles of the white pigment.

SUMMARY OF THE INVENTION

The present invention accordingly has an object to provide a novel and improved anti-glare covering for illuminate switch or indicator without the above described problems and disadvantages in the prior art coverings for similar applications.

Thus, the anti-glare covering for illuminate switch or indicator of the present invention comprises:

(a) a covering member shaped from a synthetic resin having transparency; and (b) an anti-glare microlouver sheet integrally bonded by melt-bonding to the lower surface of the covering member at the top portion thereof.

In a further improved embodiment of the invention, the inventive anti-glare covering defined above further comprises:

(c) a thin light-transmitting metallizing layer formed on the upper surface of the covering member.

DETAILED DESCRIPTION OF THE PREFERRED EMBODIMENTS

The inventive anti-glare covering for illuminate switch or indicator defined above is advantageous not only in the excellent anti-glaring effect and good visibility of the indication even under daylight but also in respect of the absence of drawbacks due to falling of the anti-glare microlouver sheet during use and absence of deposition of dusts and finger filths in the gap space around the anti-glare microlouver sheet to ensure long durability of the covering. These advantages are even more prominent when a thin light-transmitting metallizing layer is provided on the upper surface of the transparent covering member.

In the following, the inventive anti-glare covering for illuminate switch or indicator is described in detail with reference to the accompanying drawing.

Figure 1:
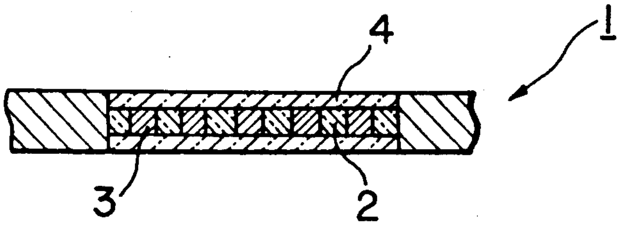
FIG. 1 Prior Art
FIG. 1 is a vertical cross sectional view of an anti-glare microlouver sheet.
Figure 2:
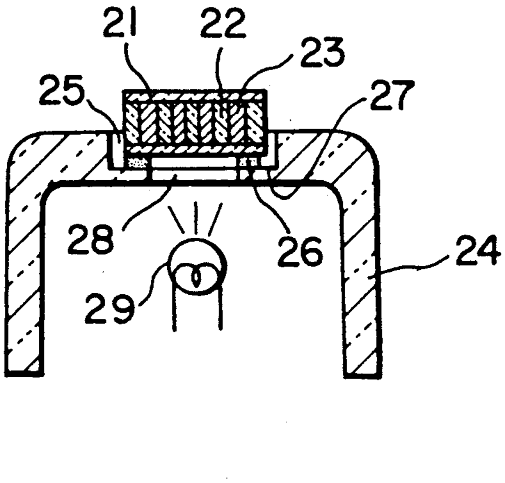
FIG. 2 Prior Art
FIG. 2 is an axial cross sectional view of a conventional anti-glare covering mounting an anti-glare microlouver sheet illustrated in FIG. 1.
Figure 3A:
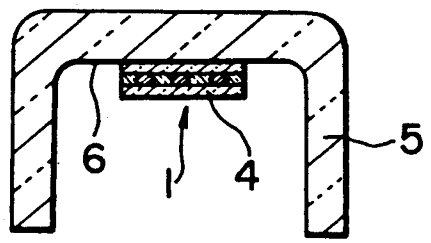
FIGS. 3*a* to 3*c* are each a vertical cross sectional view of the inventive anti-glare covering for illuminate switch or indicator comprising a covering member and an anti-glare microlouver sheet.
Figure 3B:
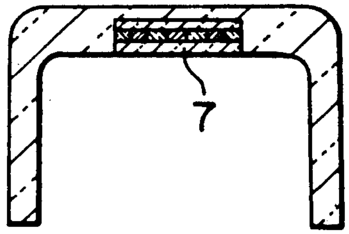
Figure 3C:
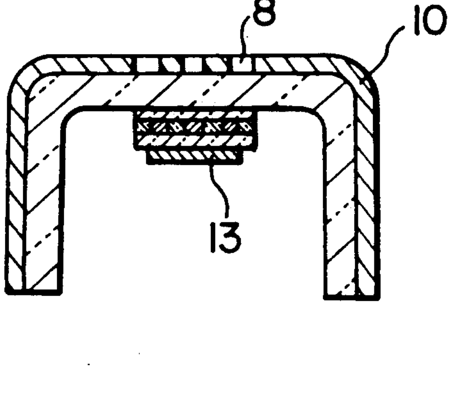

FIGS. 3*a* to 3*c* each illustrate a vertical cross sectional view of the inventive anti-glare covering which is basically constructed, as is illustrated in FIG. 3*a*, of a covering member 5 made from a transparent synthetic resin or rubber and an anti-glare microlouver sheet 1 welded or melt-bonded over the whole area to the lower surface of the covering member 5 at the top portion 6 thereof. The anti-glare microlouver sheet 1 has a striped structure, as is illustrated in FIG. 1 by a cross sectional view, composed of alternately integrated transparent layers 2 and deep-colored or opaque layers 3. It is optional that the anti-glare microlouver sheet 1 is provided on one or both of the surfaces with a protecting film or sheet 4 having transparency. FIG. 3*b* illustrates a vertical cross sectional view of an anti-glare covering of the invention which is a modification of that illustrated in FIG. 3*a*. As is illustrated in the figure, the lower surface of the transparent covering member 5 at the top portion 6 is not flat but a recess 7 is formed and the anti-glare microlouver sheet 1 is bonded to the lower surface of the top portion 6 in this recess 7.

FIG. 3*c* illustrates a further variation of the anti-glare covering illustrated in FIG. 3*a*. In this modification, the transparent covering member 5 is provided on the upper surface thereof with a light-shielding layer which is a layer of metal plating or a layer of a coating composition or ink 10, excepting the top portion 8 for illumination. If desired, the lower surface of the anti-glare microlouver sheet 1 may be provided with a coating layer 13 in a suitable color such as white and blue.

Figure 4A:
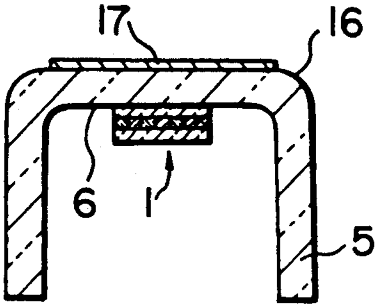
FIGS. 4*a* to 4*e* are each a vertical cross sectional view of the inventive anti-glare covering comprising a covering member, an anti-glare microlouver sheet and a thin metallizing layer.
Figure 4B:
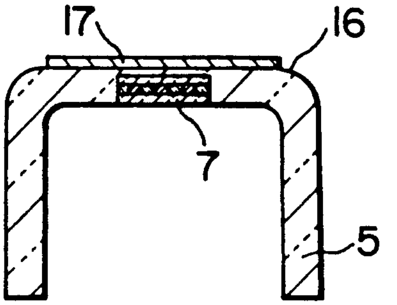
Figure 4C:
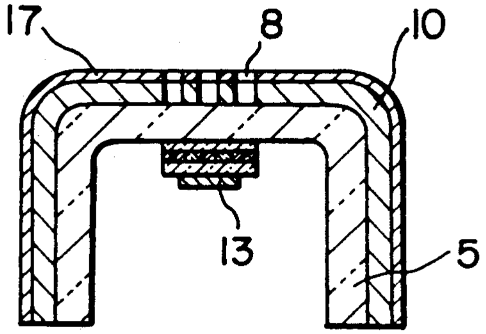
Figure 4D:
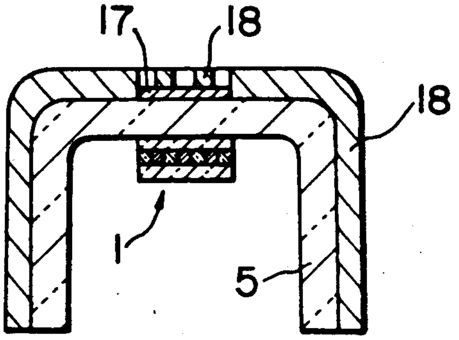
Figure 4E:
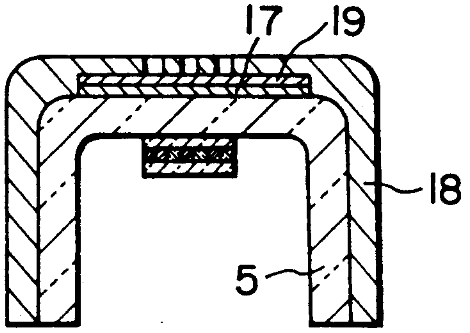

A further improvement can be obtained in the anti-glaring effect of the inventive anti-glare coverings illustrated in FIGS. 3*a* to 3*c* by providing a thin light-transmitting metallizing layer on the upper surface of the transparent covering member 5 as is illustrated in FIGS. 4*a* to 4*e*. In particular, the anti-glare coverings illustrated in FIGS. 4*a* and 4*b* by a cross sectional view are each a modification of those illustrated in FIGS. 3*a* and 3*b*, respectively, in which a thin metal layer 17 is adhesively bonded to the upper surface of the covering member 5 in the top portion 16. In the anti-glare covering illustrated in FIG. 4*c*, a thin metal film 17 is adhesively bonded to the surface of the metal plating layer 9 or the coating layer 10 in the covering illustrated in FIG. 3*c*. As is illustrated in FIG. 4*d*, it is not always necessasry to provide the light-transmitting metallizing layer 17 on the whole surface of the covering member 5 but it may be sufficient that the light-transmitting metallizing layer 17 is formed only on the upper surface of the covering member 5 just above the anti-glare microlouver sheet 1, remaining surface area of the covering member 5 being coated with a coating layer 18. When the thin metallizing layer 17 is susceptible to rusting, it is optional that the thin metallizing layer 17 is overlaid with a transparent plastic film 19 thereon for protection as is illustrated in FIG. 4*e*.

The covering member 5 used in the inventive anti-glare covering must be made from a transparent material. The material is preferably a synthetic resin or rubber having good transparency including thermoplastic resins such as acrylic resins, polycarbonate resins, polyethylenes, polypropylenes, ABS resins and the like, thermoplastic elastomers such as ethylene-propylene-diene terpolymeric rubbers and the like and synthetic rubbers such as silicone rubbers, NBRs, acrylic rubbers and the like. Poly(ether sulfone) resins, polysulfone resins, poly(ether imide) resins and the like having a glass transition temperature of 150° C. or higher are not preferable because a covering member shaped from these resins may be subject to a decrease in the mechanical strength by the thermal degradation caused in the step of hot-press bonding with the anti-glare microlouver sheet 1.

The anti-glare microlouver sheet 1, which is bonded to the lower surface of the transparent covering member 5 at the top portion, is a known material having a striped structure composed of alternately disposed transparent layers and deeply colored or opaque layers. The material of the anti-glare microlouver sheet 1 is not particularly limitative but cellulose acetate butyrate resins and silicone rubbers are conventional materials which can be used satisfactorily. Silicone rubbers are preferred in respect of the high heat resistance. If desired, the anti-glare microlouver sheet 1 can be provided with a protecting transparent sheet or plate of a resin such as polycarbonate resins on one or both of the surfaces.

The anti-glare microlouver sheet 1 is bonded to the lower surface of the covering member 5 at the top portion thereof, for example, in the following manner. Thus, the anti-glare microlouver sheet 1 is mounted on the correct position on the lower surface of the covering member 5 at the top portion thereof and press-bonded with heating so that they are melt-bonded to each other. This method, however, is sometimes subject to a drawback that distortion, optical strain, cloudiness and the like are caused in the ready-shaped covering member 5 in the step of hot-pressing.

Alternatively, therefore, the method of integral molding is preferred, in which an anti-glare microlouver sheet is mounted on one of the split molds at the correct position corresponding to the top portion of the covering member 5 and the other of the split molds is mounted thereon to define the molding space for the covering member 5 into which melt of a transparent resin or rubber is injected and molded under a pressure of, for example, 500 to 1500 $kg/cm^2$ at a temperature of 250° to 400° C. depending on the kind of the resin or rubber. By this means, the desired anti-glare covering of the invention, in which the anti-glare microlouver sheet 1 is firmly bonded to the lower surface of the covering member 5 at the correct position, can be easily obtained without the above mentioned drawbacks caused in the bonding step by hot-pressing.

As is mentioned before, the covering member 5 used in the inventive anti-glare covering may be provided with a thin light-transmitting metallic coating layer on the upper surface thereof just above the anti-glare microlouver sheet 1. Suitable metals for such a purpose include aluminum, silver, gold, copper, titanium, chromium, nickel, stainless steel and the like though not particularly limitative thereto. Aluminum is preferred in respect of the low cost and chromium is preferred in respect of the high corrosion resistance. It is of course optional that the metallic coating layer has a multilayered structure composed of layers of two kinds or more of different metals. The thickness of the metallic coating layer is preferably in the range from $2\times10^{-3}$ μm to 5 μm to ensure a light transmission of 3 to 50%.

The inventive anti-glare covering for illuminate switch or indicator is particularly useful as a key-top covering in a car-borne illuminate switch by providing a printed indication of respective letters, symbols, patterns and the like for the function of the switch by using a synthetic resin-based printing ink in a thickness of 10 to 25 μm. When coloring is desired on the side surface of the riser portion of the key-top covering, the coloring treatment is carried out by masking the surface of the key-top covering member at the top portion. Alternatively, it is of course optional that the upper surface of the key-top covering member is coated all over in a dark color and the desired letters, symbols, patterns and the like are exhibited by removing the coating layer in a suitable means of etching or laser-beam treatment with adequately controlled output. Further alternatively, the indication is given not on the upper surface of the covering member but on at least one surface of the anti-glare microlouver sheet by the method of screen printing.

The above described anti-glare covering of the invention for illuminate switch or indicator has a structure composed of a transparent covering member and a anti-glare microlouver sheet bonded to the lower surface of the covering member at the top portion by melt-bonding so that the covering is imparted with increased rigidity and resistance against pushing and free from the trouble of falling of the anti-glare microlouver sheet to have a greatly improved durability for service. In addition, the beautiful appearance as prepared can be maintained lastingly without deposition of dusts and finger filths. The function of an illuminate switch or indicator is of course fully exhibited without the troublesome imaging of the illumination on windowpanes of the car by shielding any extraneous light from inside of the switch or indicator under illumination. When the switch or indicator is not under illumination, the light from outside is limited not to reach inside of the covering so that a great improvement can be obtained in the contrast and visibility of the images of the switch or indicator. These advantageous effects can be further increased by providing a thin lighttransmitting metallizing layer on the upper surface of the covering member.

In the following, the anti-glare covering of the invention for illuminate switch or indicator is described in more detail by way of examples.

EXAMPLE 1

A silicone rubber-made anti-glare microlouver sheet of 0.95 mm thickness having a striped structure of alternately disposed transparent layers and black layers and protected on both surfaces with sheets of a polycarbonate resin (Shin-Etsu CV Film, a product by Shin-Etsu Polymer Co.) was cut into a rectangular piece of 16 mm by 9 mm wide and the piece was melt-bonded to the lower surface of a polycarbonate-made key-top covering member at the top portion having dimensions of 16 mm by 9 mm. The upper surface of the key-top covering member was coated all over with a black ink having a hiding power by pad printing leaving an indication letter uncoated. The thus prepared seamless anti-glare key-top covering for illuminate switch had increased rigidity along with good visibility so that it was quite satisfactory for use as a car-borne illuminate switch.

EXAMPLE 2

The same anti-glare microlouver sheet as used in Example 1 was coated on one surface first with a white ink and then with a blue ink before cutting into a 16 mm by 9 mm wide rectangular piece. The anti-glare microlouver sheet was melt-bonded at the uncoated surface to the lower surface of an ABS resin-made key-top covering member at the top portion. The key-top covering member was then provided on the upper surface with a metallic plating layer to have a metallic appearance and then an indication letter was formed by removing the metallic plating layer using a laser marker. The indication letter thus formed looked white when the switch was not illuminated and looked blue under illumination with good visibility but without glaringness.

EXAMPLE 3

The anti-glare key-top covering obtained in Example 1 before coating with a black ink was provided on the upper surface at the top portion with a thin chromium layer having a light transmission of 20% by the method of transferring from a hot-stamping foil by hot-pressing at 150° C. for 2 seconds. The outer surface of the key-top covering member surrounding the chromium-coated area was coated with a black ink and an indication letter was formed there by using a laser marker. The thus obtained anti-glare key-top covering for illuminate switch had good visibility, in particular, under daylight.

EXAMPLE 4

The same anti-glare microlouver sheet as used in Example 1 was coated on one surface with a blue ink by the method of screen printing before cutting into a 16 mm by 9 mm rectangular piece which was melt-bonded at the uncoated surface to the lower surface of a polycarbonate-made key-top covering member at the top portion in the same manner as in Example 1. The upper surface of the key-top covering member at the top portion was plated with nickel to have a light transmission of 15% by the method of electroless plating. The whole outer surface including the top portion was coated with a black ink and an indication letter was formed at the top portion by removing the coating layer of the black ink using a laser marker in the same manner as in Example 3. The indication letter looked blue under illumination and exhibited metallic luster of nickel without illumination to give excellent visibility when it was used in a car-borne illuminate switch.

EXAMPLE 5

A rectangular piece of the same anti-glare microlouver sheet as used in Example 1 was melt-bonded to the lower surface of a polycarbonate-made key-top covering member at the top portion and the upper surface of the covering member at the top portion was provided with a thin aluminum film of 10% light transmission formed by the method of vacuum vapor deposition. The surface of the aluminum coating layer was printed with a black ink having a hiding power by the method of pad printing leaving an indication letter unprinted and the outer surface of the key-top covering member surrounding the top portion was coated with the black ink. Further, whole upper surface of the key-top covering member was coated with a matting clear lacquer. The thus obtained anti-glare key-top covering for illuminate switch had good visibility even under daylight and was quite satisfactory for use in a carborne illuminate switch.

What is claimed is:

1. An anti-glare covering for an illuminate switch or indicator which comprises:

(a) a covering member having a flat portion and two spaced-apart leg portions extending vertically from a surface of said flat portion; and (b) an anti-glare microlouver sheet integrally melt-bonded to said covering member between said leg portions.

2. The covering of claim 1 wherein said microlouver sheet is bonded to said surface of said covering member between said leg portions.

3. The covering member of claim 1 having a recess in said surface between said leg portions, said microlouver sheet being bonded within said recess.

4. The covering member of claim 1 which further comprises a thin light-transmitting metallizing layer on a surface of the covering member opposite the surface from which the leg portions extend.

5. The anti-glare covering for illuminate switch or indicator as claimed in claim 4 wherein the thin light-transmitting meltallizing layer has a light transmission in the range from 3% to 50%.

* * * * *